United States Patent [19]

Heller et al.

[11] Patent Number: 4,848,178

[45] Date of Patent: Jul. 18, 1989

[54] MECHANICAL REMOTE SHIFT ARRANGEMENT

[75] Inventors: Hubert Heller, Meckenbeuren; Gerd Führer, Friedrichshafen, both of Fed. Rep. of Germany

[73] Assignee: Zahnradfabrik Friedrichshafen AG, Friedrichshafen, Fed. Rep. of Germany

[21] Appl. No.: 85,742

[22] PCT Filed: Nov. 21, 1986

[86] PCT No.: PCT/EP86/00673

§ 371 Date: Jul. 9, 1987

§ 102(e) Date: Jul. 9, 1987

[87] PCT Pub. No.: WO87/03255

PCT Pub. Date: Jun. 4, 1987

[30] Foreign Application Priority Data

Nov. 28, 1985 [WO] PCT Int'l Appl. .......... EP85/00652

[51] Int. Cl.[4] .................................. B60K 20/12
[52] U.S. Cl. ........................ 74/473 R; 180/89.14; 180/336
[58] Field of Search ............ 74/473 R; 180/89.14, 180/336

[56] References Cited

U.S. PATENT DOCUMENTS

| | | | |
|---|---|---|---|
| 2,137,337 | 11/1938 | Gemmer | 74/473 R |
| 2,390,711 | 12/1945 | Holmstrom | 74/473 R |
| 2,468,316 | 4/1949 | Waters | 180/54 |
| 2,669,316 | 2/1954 | Schjolin | 180/77 |
| 2,854,088 | 9/1958 | Dence | 180/77 |
| 3,978,737 | 9/1976 | Hobbensiefken et al. | 74/473 R |
| 4,206,826 | 6/1980 | McMillen et al. | 180/77 TC |
| 4,582,161 | 4/1986 | Nilsson | 180/336 |

FOREIGN PATENT DOCUMENTS

| | | | |
|---|---|---|---|
| 2326207 | 12/1974 | Fed. Rep. of Germany | 74/473 R |
| 2839244 | 3/1979 | Fed. Rep. of Germany | 180/89.14 |
| 7631081 | 5/1977 | France | |
| 1403448 | 8/1975 | United Kingdom | |

OTHER PUBLICATIONS 489, 490, 491; Reparatur Anleitung, Volvo 240, Sept. 1976, Querschnit durch die Motor-Technik.

Primary Examiner—Leslie A. Braun
Assistant Examiner—Scott Anchell
Attorney, Agent, or Firm—Herbert Dubno

[57] ABSTRACT

A mechanical remote shift arrangement for shifting gears of a motor vehicle transmission with a remote shift bracket fastened to the vehicle, equipped with a shift lever, a shift rod array consisting of shift rods and articulations in the form of universal joints which transmit the shift motions to the shift mechanism. By supporting the shift rod array in the vehicle frame by means of idler arms, a shift mechanism with a high degree of efficiency is attained despite multiple deviation of the shift rod array from a straight line. The idler arms of the idler arm bearing are fastened to the vehicle frame either journaled in ball bearings via a bearing bracket, or via tie rod ends, and have, for incorporation into the shift rod array, either on a fastening flange of a universal joint or on the fastening flange of a shift rod, a tie rod end, which enables the oscillating motion of the idler arm as well as the rotary motion of the shift rod array.

8 Claims, 5 Drawing Sheets

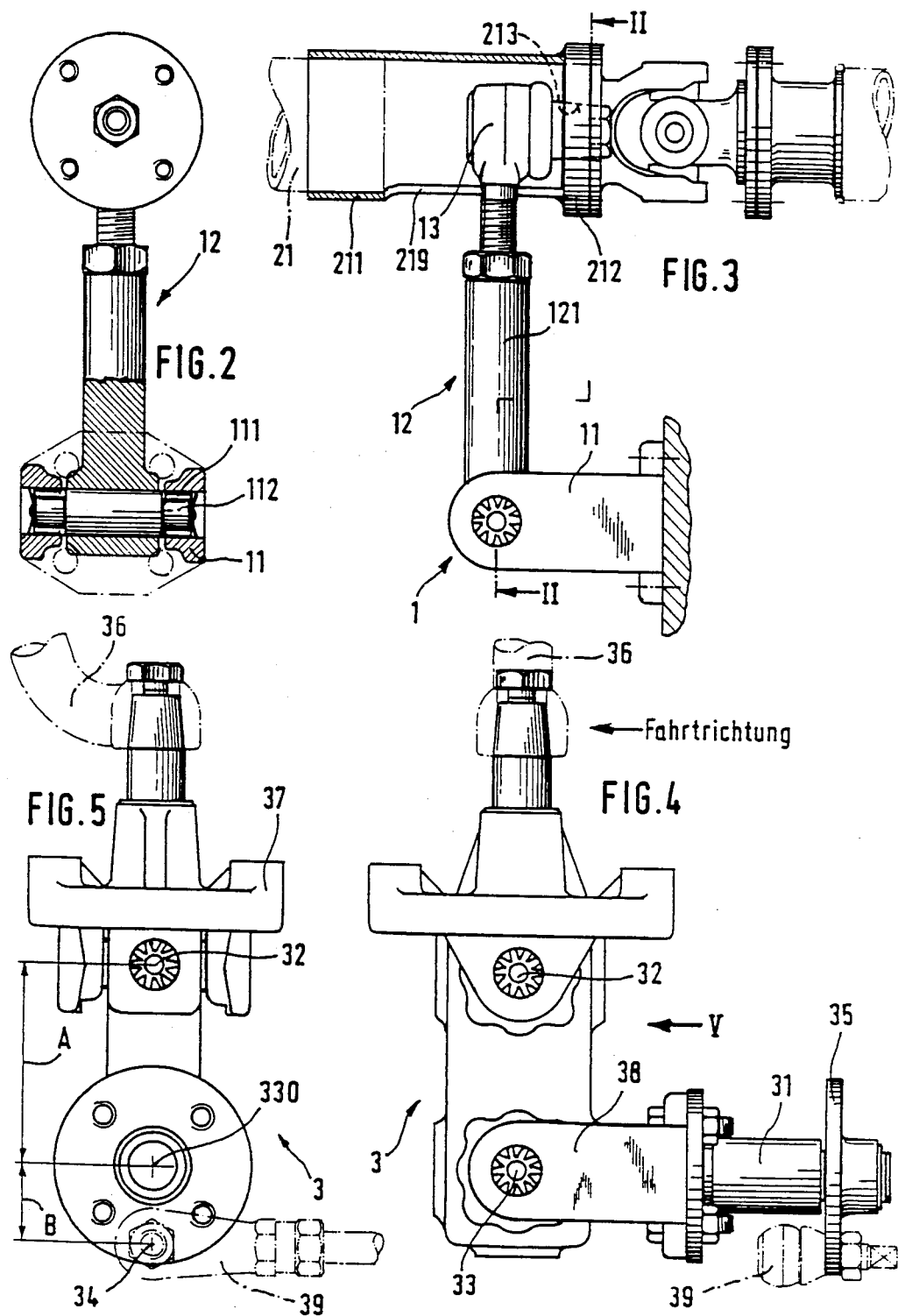

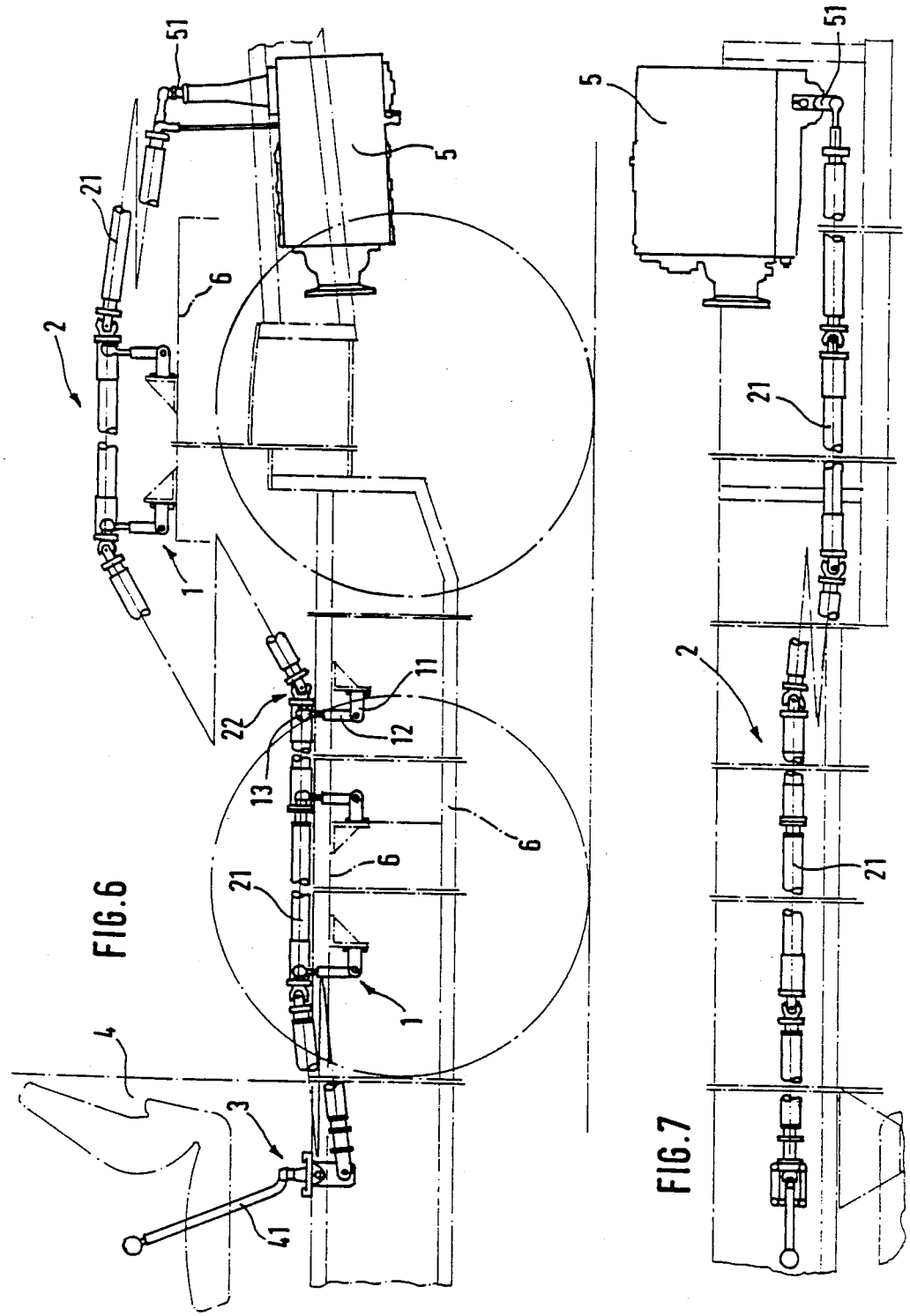

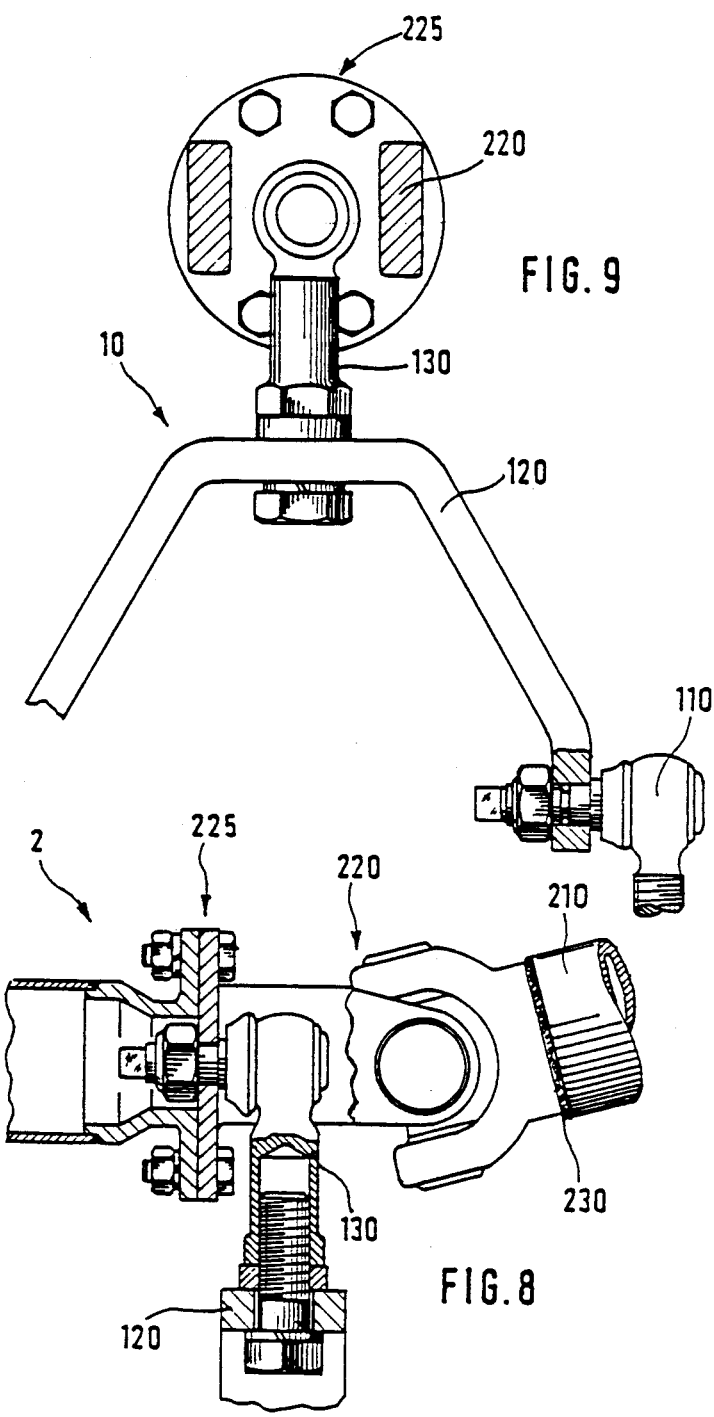

MECHANICAL REMOTE SHIFT ARRANGEMENT

CROSS REFERENCE TO RELATED APPLICATION

This application is a National Phase application of PCT/EP86/00673, filed Nov. 21, 1986, and based upon Luxembourg application Ser. No. PCT/EP85/00652 filed Nov. 28, 1985 under the International Convention.

FIELD OF THE INVENTION

Our present invention relates to a remote shift arrangement for the shifting of gears in motor vehicle transmission of the type which has a remote shift bracket fastened in the vehicle equipped with a shift lever, a shift rod array consisting of shift rods and articulations, preferably universal joints, which transmit the shift motions to a shift arrangement (e.g. a rotary input shaft) of a shift transmission, and support or idler arm bearings for the support of the shift rod array in the vehicle.

BACKGROUND OF THE INVENTION

Shift arrangements of this type are known, particularly for urban and long-distance buses, where the shift rod array has to extend over relatively great distances and where due to obstacles, such as axles, luggage compartments, and gas tanks, the shift rod array must be deviated in vertical as well as horizontal directions.

The steadily increasing utilization of the space below the floor of such buses, particularly long-distance buses, causes an ever increasing number of changes of direction in the shift rod array and thus ever more bearing locations. These bearings are preferably plain bearings for the axial displacement and rotary motion, e.g. with plastic bushings.

With increasing numbers of changes of direction and, therewith, in the number of bearing locations, friction also increases and stiffness decreases. Such remote shift arrangements require therefore high shifting forces and result in shift arrangements which are hard to operate and have poor indexing of the selected speeds.

OBJECT OF THE INVENTION

It is therefore the object of the invention to provide an improved remote shift arrangement which will facilitate operation and increase the stiffness of the shifting path and thus convenience of shifting and efficiency as well as reliability of shifting with the least possible construction cost.

SUMMARY OF THE INVENTION

This object is achieved in accordance with the invention by providing the shift rod array with at least one idler arm bearing with an idler arm movable in the longitudinal direction of the vehicle and which is journaled on the vehicle (e.g. by a bearing bracket, and tie rod end) and with its head or opposite tie rod end rotatably connected to the shift rod array. This makes possible a limited rotary and longitudinal motion of the shift rod array.

The use of idler arms for the support of the shift rod array reduces friction considerably, particularly when the shift rod array, as in modern long-distance buses, has several articulations and deviates relatively greatly from a straight-line connection from the remote shift bracket to the rotary input shaft on the transmission. Thus, comparative measurements of mechanical eficiency of 55% in customary remote shift arrays have shown improvement to 98% with sliding bearings.

By the use of a generallly known tie rod end, which is manufactured in large numbers, in the idler arm, a simple and economical solution is attained, particularly since this tie rod can be used as manufactured, without any modification.

An optimization of efficiency is attained when for the limited excursion of the idler arm from center position (i.e. for shifting of the transmission into "neutral" or extreme positions for certain speeds), ball bearings are built in between the idler arm and the fixed bearing bracket.

Tie rod ends can also be used as bearing brackets in connection with idler arms formed as forks because the oscillating motion is relatively small.

When the connecting cone of the tie rod end is centrally fastened in a corresponding bore in the connecting flange of a universal joint, e.g. in known manner with a nut secured on a threaded stud, then the tie rod end can be passed easily over the open linkage portion. The shift rods can then be formed in known manner with connecting flanges on both ends, without any aperture for the idler arm. It is also possible, when particularly narrow universal joints are to be used, and the tie rod end has no room within the universal joint, to array the connecting cone centrally on the connecting flange of a shift rod. However, in this solution an aperture must be provided in the shift rod for the idler arm.

The shifting rigidity or stiffness and thus the reliability of the remote shift arrangement can be further improved when the remote shift bracket, preferably constructed with universal joints, is equipped with an amplifying means for the shift motion.

The remote shift arrangement is particularly suited for buses with a remote shift bracket in the driver's cab and the transmission in the rear of the vehicle due to the large distance and the relatively many supports and deviations of the shift rod array from a straight line. However, a remote shift arrangement with idler arms can also be an advantage for transmissions which are flanged onto an engine in the center of the vehicle or for transmissions emplaced to the rear of the driver's cab and where the shift rod array has several bearings.

Once a universal joint is e.g. welded to a shift rod, then only one flange connection per articulation is necessary in the shift rod array.

The adaptation of the shift rod array to the vehicle frame and the adjustment operations between the remote shift box and the input shaft on the transmission can be simplified considerably when the flange connections are formed as clamp connections which fix the shift rod arrays in axial and circumferential direction after the idler arms are fastened to the vehicle frame.

A particularly simple clamp connection is attained by means of a conical bore in a section of the universal joint which is provided in the area of the integral flange. A slotted conical clamp ring which lies partly in this bore is thereby axially displaced by a second flange slid over the shift rod when the fastening screws are tightened and effect clamping between the universal joint and the shift rod.

BRIEF DESCRIPTION OF THE DRAWING

The above and other objects, features and advantages of the present invention will become more readily apparent from the following description, reference being made to the accompanying drawing in which:

FIG. 2 is an elevation of an idler arm bearing according to FIG. 1 but shown broken away long a section line II—II of FIG. 3;

FIG. 3 is another elevation of an idler arm bearing according to FIG. 1, but showing a further embodiment of the attachment;

FIG. 4 shows a remote shift bracket in elevation;

FIG. 5 shows a remote shift bracket in a side view in the direction of the arrow V of FIG. 4;

FIG. 6 shows a remote shift array in side view;

FIG. 7 shows a remote shift array in plan view;

FIG. 8 shows an idler arm bearing according to FIG. 1 in a further embodiment in a partially sectioned elevational view;

FIG. 9 shows an idler arm bearing according to FIG. 8 in section;

SPECIFIC DESCRIPTION

Figure 1:
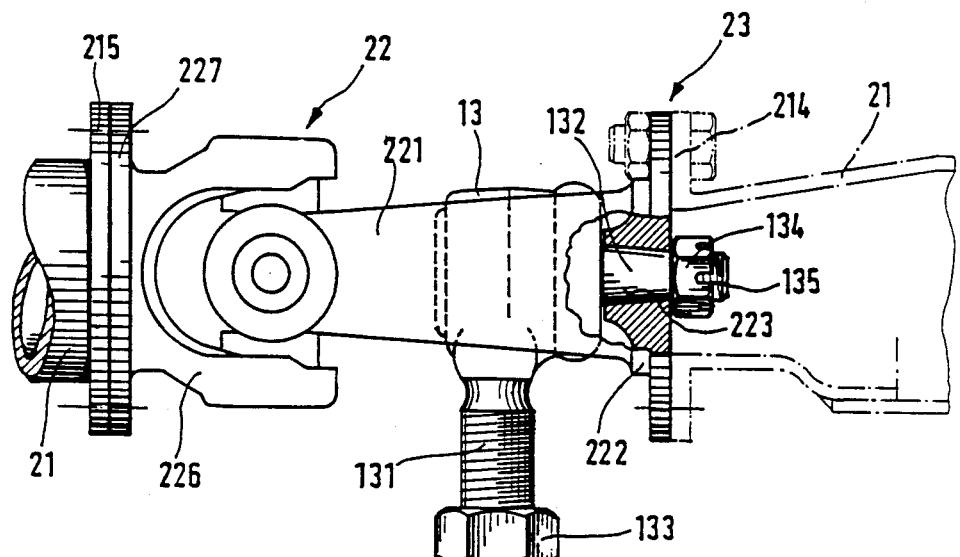
FIG. 1 is a partial elevation of an idler arm bearing fastened to a universal joint.

According to FIG. 1, the idler arm bearing 1 consists of the idler arm 12 which is connected to the bearing bracket 11 fastened to the vehicle frame 6 via trunnion 111 and ball bearing 111 (see FIG. 2). The idler arm 12 has a shaft 121 which a bore and an internal thread, into which threaded portion 131 of a tie rod end 13 is screwed, and held by means of jam nut 133. The conical extension 132 of the tie rod end 13 is held in a conical bore 223 of the connecting flange 222 of universal joint 22—via threaded stud 135 and nut 134. So as to make it possible to position and fasten tie rod end 13 centrally upon connecting flange 222, the joint section 221 of the universal joint 22 must be of sufficient size, whereas the second joint section 226 can be made of a common short construction. On the two connecting flanges 222 and 227 of the universal joint 22, the corresponding connecting flanges 214 and 215 are fastened by means of connecting screws 23. The tube of the shift rod 21 may be reduced in diameter conically as well as cylindrically in order to hold down the overall diameter of the connecting flanges. The section II—II of FIG. 2 taken through FIG. 3 shows in particular the arrangement of the ball or plain bearings 111 between idler arm 12 and bearing bracket 11.

The idler arm bearing according to FIG. 3 is, in principle, constructed like that of FIG. 1, only the attachment of the tie rod end 13 is effected not on the connecting flange of the universal joint, but on the connecting flange 212 of a shift rod 21, where between the connecting flange and the shift rod, a tube section 211 is provided with an aperture 219 for passing the tie rod end 13.

By means of the remote shift bracket of FIGS. 4 and 5, the selection and shift motion is transmitted in known manner from the driver's position via shift lever 36, the bracket 37 articulated to the vehicle and via a fork 38 to the shift rod array shown in FIGS. 6 and 7 (see DE-PS No. 21 59 195).

The ratio of the lever arms or distances for the shift motion between the center of rotation and oscillation 32 on the universal joint of shift bracket 37, and the center of the universal shifting joint 330 designated A, on the one hand, and the center of the shifting joint 330 and the support point 34 for 39, designated B, on the other hand establishes the displacement of the rod by the shift lever.

The extension 31 with the connecting flange 35, which is fastened on the fork 38, as in FIG. 4, can engage the rod 39.

From FIG. 6 in elevation and FIG. 7 in plan view, the entire remote shifting array can be discerned between remote shift bracket 3 with the shift lever 41 in the driver's cab 4 and the transmission 5 with the rotary input shaft 51 in the rear of the vehicle. The vehicle frame 6 serves to carry the idler arm bearings 1 as well as the remote shift bracket 3 and the transmission 5. The shift rod array 2 consists of the shift rods 21, whereby the support on the vehicle frame 6 may be effected via the idler arm bearings 1 according to FIGS. 1 to 3, by way of example.

FIGS. 8 and 9 show a further embodiment of the idler arm bearing 10, where the idler arm 120 is realized in shape of a yoke. It carries a tie rod end 130, which, as already described in FIG. 1, is connected centrally in a portion of universal joint 220 either by a conical connection or via a cylindrical bore (see FIG. 8).

The idler arm 120 is fastened to the vehicle frame in an articulated manner via two further tie rod ends 110, where the tie rod ends 110 permit a limited oscillating motion of the idler arm 120 and thus a limited motion of the shift rod array 2 in axial direction.

One of the shift rods 210 is solidly connected to the universal joint 220, i.e. with a weld seam 230. Thus very point of articulation or universal joint of the shift rod array 2 has only one flange connection 225.

Figure 10:
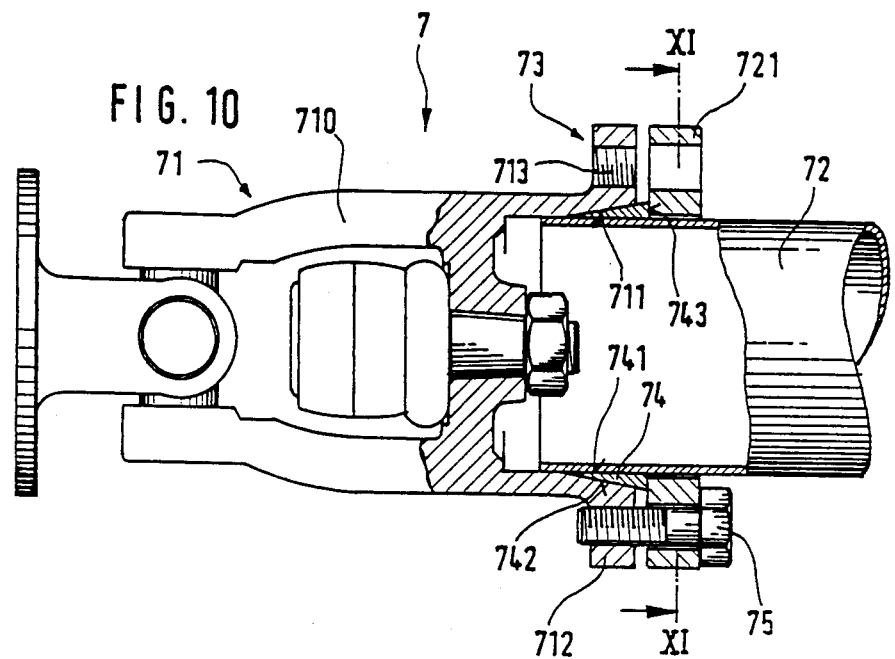
FIG. 10 shows a flange connection in longitudinal sectional.
Figure 11:
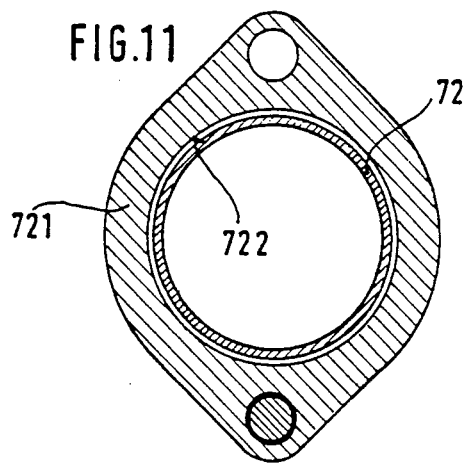
FIG. 11 is a cross section according to FIG. 10 in the area of the second flange and the shift rod.

In a further embodiment according to FIGS. 10 and 11 in the area of the shift rod bearing array 7 the connection between the universal joint 7 and the shift rod 72 is formed as an adjusting and clamping device 73, in order to simplify the axial adaptation of the shift rod array 2 to the vehicle frame 6, and the centering of the shift rods 72 in the universal joint 71.

For this purpose, the section of the universal joint 710 has in the area of the integral flange 712 a conical bore 711 for the reception of a slotted conical clamp ring 74, and the fastening lugs of flange 712 have tapped holes 713 for the reception of fastening screws 75. The second flange 721 is not connected solidly to the shift rod 72, but is slid with its large bore 722 with radial play over the shift rod which is approximately cut to length.

A slotted conical clamp ring 74 has a cylindrical bore 741 and is likewise slide over the precut end of the shift rod when the universal joint 71 is slid upon shift rod 72, the radially outer cone 741 comes to lie partly in the conical bore 711 of the universal joint section 710.

When after fastening of the shift rod support 7 to the vehicle frame 6 the fastening screws 75 are tightened, then the second flange 721 bears against the face 743 of clamp ring 74, and the shift rod array is fixed in the position preadjusted by the adjusting and clamping device 73. If the cone 742 is fabricated with an angle of about 8° to 9°, then all shifting forces in axial and circumferential direction can be transmitted with this clamping arrangement.

The remote shift arrangement operates as follows: if according to FIG. 4, the shift lever is moved, e.g. in the direction of vehicle motion to the left, then the speeds 1, 3, 5, 7, lying in the direction of motion in the shift array are preferentially engaged. Thereby the motion is redirected about the center of rotation and oscillation 32, and the articulation for the shift moves opposite the vehicle direction, that is to the right. Thereby the shift rod assembly attached to the connecting flange 35 is likewise moved to the right and all of the supporting idler arms are swung from the central position shown in FIG. 1 about trunnions 112 into a final position about 17° to the right. In cooperation with universal joints 22, the provision of ball bearings between bearing bracket 11 and idler arm 12 and the mobility of the conical connection 132 on tie rod end 13 facilitate a freely movable translatory motion, which e.g. assures a rotation of the rotary input shaft 51 on transmission 5, whereby the engagements of the gears occurs in known manner via shift rods and idler arms.

For selection of the slots of the shift pattern, the shift lever according to FIG. 5 is moved transversely to the vehicle motion, e.g. to the left, and (therefore) point 33 moves to the right due to rotation about center of rotation and oscillation 32. Since support point 34 remains stationary due to support by support rod 39, there results a rotation motion upon shift rod array 2. This rotating motion of the shift rod array 2 leads to a translatory motion of the rotary input shaft 51 in transmission 5 and thus to the selection of the slots in the shift pattern and (this rotary motion) is essentially unimpeded by the tie rod ends 13 of the idler arm bearings 1.

We claim:

1. A remote shifting assembly for an automotive vehicle, comprising:
   a shift lever articulated on the vehicle for speed-selection movements;
   a transmission on the vehicle having a speed-selection element moveable in response to displacement of said shift lever and located remote from said shift lever; and
   a shift-rod assembly extending between and operatively connecting said shift lever with said speed-selection element for transmitting movements of said shift lever to said speed-selection element, said shift-rod assembly comprising:
   a member connected to said shift lever and capable of being longitudinally displaced in a direction of movement of the vehicle and angularly displaced about a longitudinal axis,
   another member connected to said element and capable of being longitudinally displaced and angularly displaced in response respectively to longitudinal and angular displacement of said member connected to said shift lever,
   means forming at least one universal joint angularly interconnecting said members and shiftable relative to the vehicle to transfer longitudinal displacement of said member connected to said shift lever to said speed-selection element, and
   at least one idler-arm assembly for supporting said shift-rod assembly on said vehicle, said idler-arm assembly comprising:
   an idler-arm head rotatably connected to said universal joint and permitting rotation thereof relative to said idler-arm assembly,
   an idler arm carrying said head at one end of said idler arm, and
   means for pivotally connecting another end of said idler arm to said vehicle for swinging movement about a pivot axis transverse to said direction of movement, thereby permitting limited angular and longitudinal displacement of said shift-rod assembly relative to said vehicle, said means for pivotally connecting another end of said idler arm to said vehicle for swinging movement including a bearing bracket fastened to said vehicle, a threaded tie rod end connected to said head, a shaft swingably connected to said bracket for swinging movement about said pivot axis transverse to said direction of movement and threadedly and adjustably receiving said threaded tie rod end, and a conical formation on said head fastened centrally to a section of said universal joint.

2. The remote shifting assembly for an automotive vehicle defined in claim 1 wherein said other end of said idler arm is a fork having two pivots respectively connected to said vehicle for swinging movement about said pivot axis transverse to said direction of movement.

3. The remote shifting assembly for an automotive vehicle defined in claim 1 wherein said shaft is connected to said bracket by a ball bearing.

4. The remote shifting assembly for an automotive vehicle defined in claim 1 wherein said shaft is connected to said bracket by a plain bearing.

5. The remote shifting assembly for an automotive vehicle deifned in claim 1 wherein one of said members is a shifting rod formed with a tubular section into which said head extends laterally.

6. The remote shifting assembly for an automotive vehicle defined in claim 1 and wherein the vehicle is a long-distance bus with said shift lever being located at a front of the vehicle and said transmission located at a rear of said vehicle, said shift-rod assembly comprises a muliplicity of shifting rods forming said members and having a plurality of said universal joints between said members between said shift lever and said transmission, and each of said universal joints is provided with a respective one of said idler-arm assemblies.

7. The remote shifting assembly for an automotive vehicle defined in claim 1, further comprising an adjusting, centering and clamping device securing at least one of said members to said universal joint.

8. The remote shifting assembly for an automotive vehicle defined in claim 1 wherein said adjusting, centering and clamping device comprises:
   a tubular part on said universal joint having a frustoconical bore and a flange surrounding said bore,
   a shift rod end forming said one of said members extending into said bore,
   a frustoconical clamping ring surrounding said shift rod end and wedged into said bore, and
   a further flange surrounding said shift rod end, bearing axially on said ring and bolted to the flange on said tubular part.

* * * * *